E. B. BARNER.
NON-REFILLABLE BOTTLE.
APPLICATION FILED MAR. 16, 1910.

973,099.

Patented Oct. 18, 1910.

Witnesses

Inventor
Ernest B. Barner.
By E. E. Vrooman,
his Attorney.

THE NORRIS PETERS CO., WASHINGTON, D. C.

UNITED STATES PATENT OFFICE.

ERNEST B. BARNER, OF ELKHORN, OREGON.

NON-REFILLABLE BOTTLE.

973,099.   Specification of Letters Patent.   Patented Oct. 18, 1910.

Application filed March 16, 1910. Serial No. 549,595.

*To all whom it may concern:*

Be it known that I, ERNEST B. BARNER, a citizen of the United States, residing at Elkhorn, in the county of Marion and State of Oregon, have invented certain new and useful Improvements in Non-Refillable Bottles, of which the following is a specification, reference being had therein to the accompanying drawing.

This invention relates to non-refillable bottles and has for its object, more particularly, the production of a spring pressed closure therefor.

Another object of this invention is the production of a closure which is simple in construction, efficient in operation and consists of a comparatively small number of parts.

With these and other objects in view this invention consists of certain novel constructions, combinations and arrangements of parts as will be hereinafter fully described and claimed.

Figure 1:
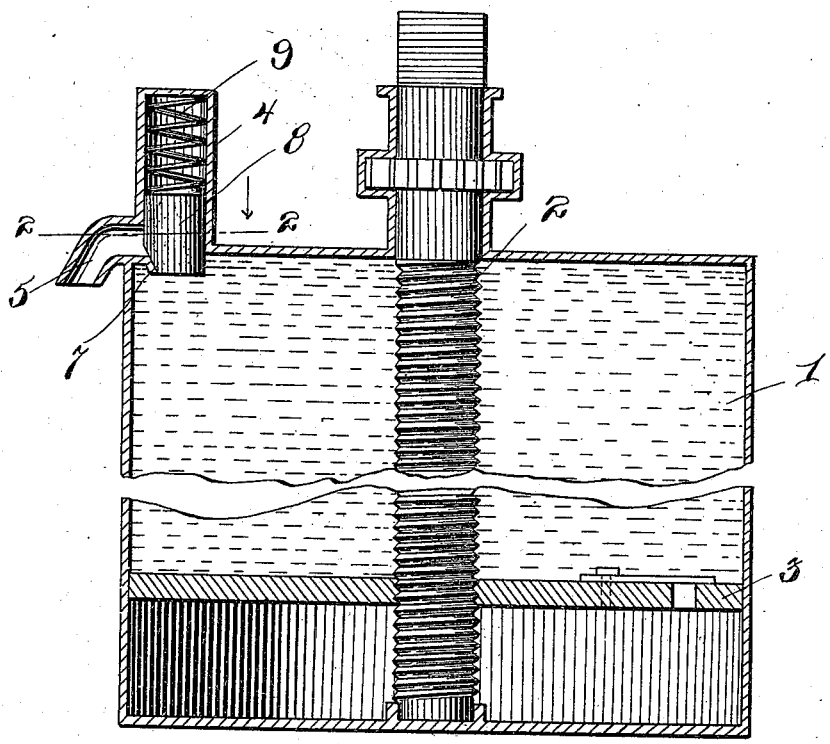
Figure 2:
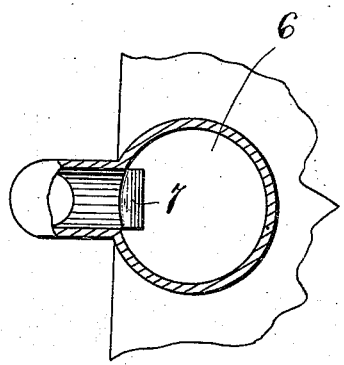
Figure 3:
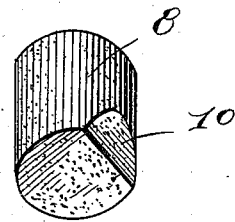

In the drawings: Figure 1 is a vertical section of the bottle. Fig. 2 is a section taken on the line 2—2 of Fig. 1 looking in the direction of the arrow. Fig. 3 is a detail perspective view of the plunger cork.

Referring to the drawings by numerals (1) designates a bottle which carries a threaded member (2). Upon the threaded member (2) works a follower 3 which is adapted to force the liquid contained within the bottle out through an outlet opening hereinafter described.

The bottle (1) is provided upon the top thereof with an upwardly-extending casing (4) which is provided with a discharge spout (5). An aperture (6) forms a communication between the casing (4) and the top of the receptacle (1) and allows the liquid to be discharged from the discharge spout (5). Upon one side of the aperture (6) is formed a downwardly extending lip (7). A plunger cork (8) is positioned within the casing (4) and is adapted to normally close the opening (6). A coil spring (9) is also positioned within the casing (4) and engages the top of the plunger (8). The plunger (8) is provided with a beveled portion (10) which is adapted to engage the lip (7) as clearly shown in Fig. 1 and tightly closes the aperture (6) and prevents the flow of liquid therethrough.

It will be obvious that by having the aperture (6) provided upon one side with a downwardly extending lip (7) and the plunger (8) being provided on one side with a beveled portion (10) that when the spring (20) forces the plunger 8 into the aperture (18) the opening will be tightly closed, and also by having the downwardly extending portion, when the liquid is forced against the plunger (8) the plunger will readily yield and allow the liquid to flow through the aperture and out through the discharge spout.

The follower 3 is adapted to work upon the threaded member (2) as clearly described in my previous application filed April 3, 1909, Serial No. 487,735, and allowed July 26, 1909.

What I claim is:

1. A receptacle of the class described comprising a body, provided with a casing, formed upon the top thereof, said casing provided with a discharge nozzle, said body provided with an aperture formed in the top thereof and communicating with said casing, a downwardly extending lip formed upon one side of said aperture, a plunger positioned in said casing, and provided with a beveled side, said beveled side adapted to engage said downwardly extending lip and tightly close said aperture or opening, a coil spring positioned in the top of said casing and engaging said plunger for normally holding said plunger in said aperture and preventing the flow of liquid through said aperture and said discharge spout, and means for forcing the liquid through said discharge nozzle.

2. A receptacle of the class described comprising a body, provided with a casing formed thereon, a discharge spout communicating with said casing, said body provided with an aperture, a depending portion formed upon one side of said aperture, a plunger positioned within said casing and provided with means for engaging said top portion, resilient means carried by said casing and body to engage said plunger for holding the same within said aperture and preventing the flow of liquid therethrough, and means for forcing the liquid through said discharge nozzle.

In testimony whereof I hereunto affix my signature in presence of two witnesses.

ERNEST B. BARNER.

Witnesses:
W. P. NEVITT,
E. L. PAYNE.